(12) United States Patent
Tho et al.

(10) Patent No.: US 8,527,020 B2
(45) Date of Patent: Sep. 3, 2013

(54) MOBILE TERMINAL

(75) Inventors: Gihoon Tho, Seoul (KR); Suncheon Ok, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/555,525

(22) Filed: Jul. 23, 2012

(65) Prior Publication Data

US 2013/0045781 A1 Feb. 21, 2013

(30) Foreign Application Priority Data

Aug. 17, 2011 (KR) .......................... 10-2011-0081780

(51) Int. Cl.
*H04W 88/02* (2009.01)
(52) U.S. Cl.
USPC ........................................ 455/575.1; 349/57
(58) Field of Classification Search
USPC .......... 455/575.1–575.8; 361/679.01–679.61
See application file for complete search history.

(56) References Cited

U.S. PATENT DOCUMENTS

| 7,386,518 B2 * | 6/2008 | Cordery et al. ................. 705/78 |
| 2010/0143827 A1 * | 6/2010 | Horgan et al. .................... 430/2 |
| 2012/0302294 A1 * | 11/2012 | Hammond et al. ........... 455/567 |

FOREIGN PATENT DOCUMENTS

| KR | 2009048263 A | * | 5/2009 |
| WO | WO 2005059635 A1 | * | 6/2005 |

* cited by examiner

*Primary Examiner* — Kamran Afshar
(74) *Attorney, Agent, or Firm* — Lee, Hong, Degerman, Kang & Waimey

(57) ABSTRACT

A mobile terminal includes a terminal main body, a stereoscopic cover portion constituting at least on portion of the terminal main body, and a light emitting portion disposed close to any one side of the stereoscopic cover portion. In the mobile terminal, the stereoscopic cover portion includes first and second members formed transparent or translucent to cover each other, a lens array layer stacked between the first and second members and having convex or concave lenses disposed in a lattice form, a first pattern layer formed on any one surface of the first member, and a shielding wall disposed between the light emitting portion and the lens array layer so as to decrease the transmittance of light irradiated to the lens array layer from the light emitting portion. Accordingly, it is possible to provide a mobile terminal having an external appearance provided with various stereoscopic and visible effects.

22 Claims, 8 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2011-0081780, filed on Aug. 17, 2011, the contents of which is incorporated by reference herein in its entirety.

BACKGROUND OF THE INVENTION

1. Field of the Invention

The present disclosure relates to a mobile terminal having a unique external appearance.

2. Background of the Invention

As functions of a terminal are varied, the terminal is implemented as a type of a multimedia player having complex functions, for example, a function of photographing photos or moving pictures, a function of reproducing music and moving picture files, a function of playing games, a function of receiving broadcasting, etc.

Terminals may be divided into a mobile/portable terminal and a stationary terminal depending on their mobility. The mobile terminal is a portable device that can be carried anywhere and have one or more of a function of performing voice and video calls, a function of inputting/outputting information, a function of storing data, etc.

As functions of the mobile terminal are varied, the mobile terminal is implemented as a type of a multimedia player having complex functions, for example, a function of photographing photos or moving pictures, a function of reproducing music and moving picture files, a function of playing games, a function of receiving broadcasting, etc.

Efforts for improving the structural and/or software part of the mobile terminal have been made in order to support and develop these functions of the mobile terminal.

Recent mobile terminals combining a communication function, etc. with these functions are frequently used. Since the recent mobile terminals have a function of processing various types of data, a multimedia function, etc. as well as the communication function, the recent mobile terminals are hardly distinguished from computers, etc.

A consumer can select a mobile terminal in consideration of not only its functions but also a feeling of sensible satisfaction. Thus, the external appearance of the mobile terminal is one of important factors for selecting the mobile terminal.

The mobile terminal having a communication function is generally divided into a bar-type terminal (including a full touch screen type terminal), a folder-type terminal, a slide-type terminal, etc.

A battery, etc. is (attachably/detachably) provided to the rear of a main body in the bar-type terminal, the rear of a lower main body in the folder-type terminal, or the rear of a lower main body in the slide-type terminal. In addition, a camera or flash providing an illumination function necessary for photographing is provided to the rear of the main body in the bar-type terminal, the rear of the lower main body in the folder-type terminal, or the rear of the lower main body in the slide-type terminal. However, the area of the battery and camera used is smaller than the remaining area of the rear of the main body, and the design of the rear of the main body is monotonous.

The design or configuration of the rear of the main body having the battery provided thereto is mostly similar in all mobile terminals, and it is not each to vary the design of the rear of the main body. Therefore, it is required to develop a method of varying the design of the rear or surface case of a mobile terminal, thereby improving user's interest and feeling of satisfaction.

SUMMARY OF THE INVENTION

Therefore, an aspect of the detailed description is to provide a mobile terminal having an external appearance with a different type from existing external appearances. Particularly, an aspect of the detailed description is to provide a mobile terminal having an external appearance with various visible and stereoscopic effects provided by illumination.

To achieve these and other advantages and in accordance with the purpose of this specification, as embodied and broadly described herein, a mobile terminal includes a terminal main body, a stereoscopic cover portion constituting at least on portion of the terminal main body, and a light emitting portion disposed close to any one side of the stereoscopic cover portion. In the mobile terminal, the stereoscopic cover portion includes first and second members formed transparent or translucent to cover each other, a lens array layer stacked between the first and second members and having convex or concave lenses disposed in a lattice form, a first pattern layer formed on any one surface of the first member, and a shielding wall disposed between the light emitting portion and the lens array layer so as to decrease the transmittance of light irradiated to the lens array layer from the light emitting portion.

In one exemplary embodiment, the first member may be formed in the shape of a plate so as to have first and second surfaces opposite to each other, and the first pattern layer may be formed on any one of the first and second surfaces.

In one exemplary embodiment, the second member may be formed in the shape of a plate so as to have third and fourth surfaces opposite to each other, and a second pattern layer may be formed on any one of the third and fourth surfaces.

In one exemplary embodiment, the shielding wall may be extended from the one side so as to cover at least one portion of the second surface.

In one exemplary embodiment, a third pattern layer corresponding to at least one of a symbol, a character and a figure may be formed to cover at least one portion of the first pattern layer.

In one exemplary embodiment, the first pattern layer may be formed close to the focal distances of the lenses.

In one exemplary embodiment, the shielding wall may be extended from the one side so as to cover at least one portion of the first surface.

In one exemplary embodiment, a polarizing plate may be stacked on the first surface of the first member.

In one exemplary embodiment, the degree of haze or diffusion of the first member may be higher than that of haze or diffusion of the second member.

In one exemplary embodiment, the first member may become a path of light from one end close to the light emitting portion to the other end thereof, and an adjusting pattern continuously changed may be formed in the inside of the first member so as to adjust the degree of haze of light from the one end to the other end.

In one exemplary embodiment, the thickness of the first member may be continuously changed from the one end close to the light emitting portion to the other end thereof.

In one exemplary embodiment, the light emitting portion may include an optic fiber, and the optic fiber may be disposed to surround the stereoscopic cover portion.

In one exemplary embodiment, the first member may be formed with a polarizing plate.

To achieve the above aspect of this specification, a mobile terminal includes a terminal main body, a stereoscopic cover portion constituting at least on portion of the terminal main body, and a light emitting portion disposed close to any one side of the stereoscopic cover portion. In the mobile terminal, the stereoscopic cover portion may include a plate member formed transparent or translucent to have upper and lower plate surfaces opposite to each other, a first lens array layer formed on the upper plate surface and having convex or concave lenses disposed in a lattice form, a first plate pattern formed to cover at least one portion of the lower plate surface, and a shielding wall disposed between the plate member and the light emitting portion so as to decrease the transmittance of light irradiated to the plate member from the light emitting portion.

In one exemplary embodiment, the shielding wall may be extended from the one side so as to cover at least one portion of the lower plate surface.

In one exemplary embodiment, the first plate pattern may correspond to at least one of a symbol, a character and a figure.

In one exemplary embodiment, the extended shielding wall may be formed to cover a side surface of the plate member.

In one exemplary embodiment, a polarizing plate may be stacked on the lower plate surface.

In one exemplary embodiment, the light emitting portion may include an optic fiber, and the optic fiber may be disposed to surround the stereoscopic cover portion.

In one exemplary embodiment, the stereoscopic cover portion may further include a second lens array layer formed on the lower plate surface and having convex or concave lenses disposed in a lattice form.

In one exemplary embodiment, the stereoscopic cover portion may further include a second plate pattern formed to cover at least one portion of the second lens array layer.

In one exemplary embodiment, the plate member may become a path of light from one end close to the light emitting portion to the other end thereof, and an adjusting pattern continuously changed may be formed in the inside of the plate member so as to adjust the degree of haze of light from the one end to the other end.

In one exemplary embodiment, the distance between the first plate pattern and the first lens array layer may be close to the focal distances of the lenses of the first lens array layer.

As described above, according to the exemplary embodiments, it is possible to provide a mobile terminal having an external appearance provided with various stereoscopic and visible effects.

Further, user's interest and satisfaction can be improved by varying the design of the front of the mobile terminal or surface housing.

In addition, the cover for covering the surface of the mobile terminal is configured to have the stereoscopic effect, and the illumination function is provided at the same time, so that it is possible to provide a more splendid visible effect to the housing formed to have the stereoscopic effect.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
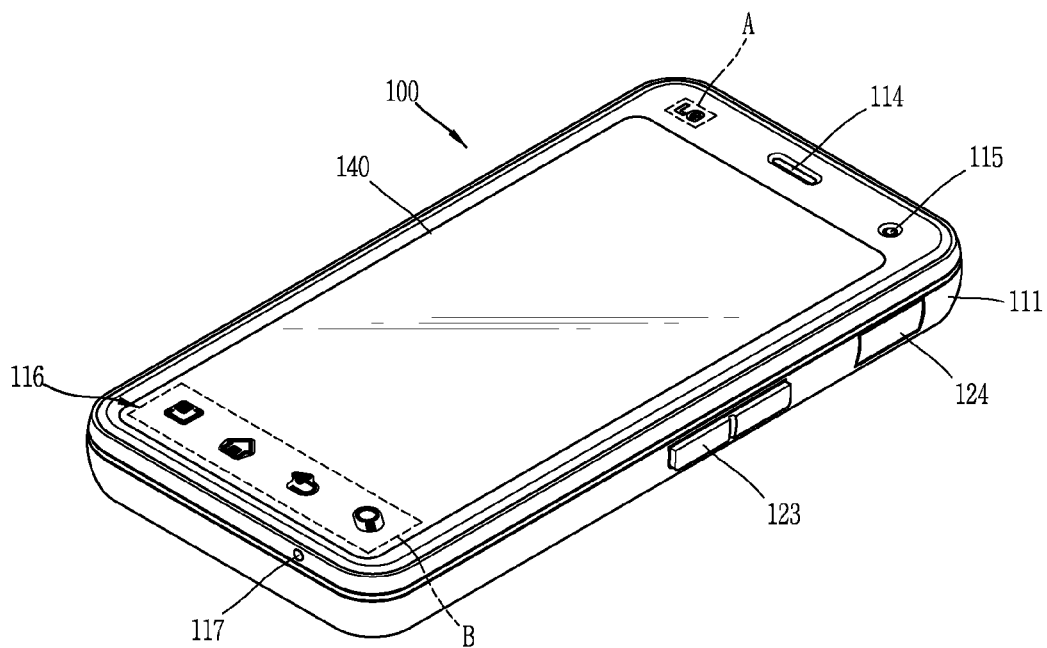
FIG. 1 is a front perspective view of a mobile terminal according to an exemplary embodiment.

FIG. 1 is a perspective view of a mobile terminal 100 as viewed from the front according to an exemplary embodiment.

A case (casing, housing, cover, etc.) constituting the external appearance of a main body of the mobile terminal 100 is formed by a front case 111 and a rear case 113. Various types of electronic components are built in a space formed by the front and rear cases 111 and 113. At least one middle case 112 may be additionally disposed between the front and rear cases 111 and 113. The cases may be formed by injecting synthetic resin or may be formed of a metal material, e.g., stainless steel (STS), titanium (Ti), etc.

A display portion 140, a first audio output portion 114, a first video input portion 115, a first manipulating portion 116, an audio input portion 117, etc. may be disposed in the front case 111.

The display portion 140 includes a display module 141 (See FIG. 3) such as a liquid crystal display (LCD) module or an organic light emitting diode (OLED) module, which visually expresses information. The display portion 140 may be formed as a touch screen to enable information to be input by a user's touch.

The first audio output portion 114 may be implemented in the form of a receiver or speaker.

The first audio input portion 115 may be implemented in the form of a camera module for photographing an image or moving picture of a user, etc.

The first manipulating portion 116 receives a command for controlling the operation of the mobile terminal 100 related to an exemplary embodiment of the present invention. The first manipulating portion 116 may be a key area formed to receive a user's touch input on a window portion. Alternatively, the first operation portion 116 may be implemented to include a dome switch formed at a lower end of the window portion so that the first manipulating portion 116 can receive an input by pushing the dome switch.

The audio input portion 117 may be implemented in the form of, for example, a microphone so as to receive a user's voice, other sounds, etc.

A second manipulating portion 123, an interface 124, a power supply portion 125, etc. may be disposed in the rear case 113 mounted at the rear of the mobile terminal 100.

The second manipulating portion 123 may be mounted on a side surface of the front case 111. The first and second manipulating portions 116 and 123 may be commonly referred to as a manipulating portion. The manipulating portion may employ any manner as long as the manipulating portion uses a tactile manner that a user operates the manipulating portion while having a tactile feeling. For example, the manipulating portion may be implemented as a dome switch, touch screen or touch pad which can receive a command or information by a user's push or touch manipulation, or may be implemented in a wheel or jog manner for rotating a key, a manipulating manner using a joystick, etc.

In a functional aspect, the first manipulating portion 116 may be used to input menus such as menus "start," "finish," etc, and the second manipulating portion 123 may operate as a hot-key for performing a specific function such as activation of the first video input portion 115, as well as a scroll function. If the first and second manipulating portions 116 and 123 are minimized as illustrated in this figure, telephone numbers, characters, etc. may be input using a touch screen provided to the display portion 140.

The interface 124 becomes a gateway through which the mobile terminal 100 performs data exchange, etc. with an external device. For example, the interface 124 may be at least one of a connection terminal through which the mobile terminal 100 is connected to an ear phone by cable or radio, a port for local area communication, e.g., an infrared data association (IrDA) port, a Bluetooth portion, a wireless LAN port, and power supply terminals for supplying power to the mobile terminal 100. The interface 124 may be a card socket for accommodating an external card such as a subscriber identification module (SIM) card, a user identity module (UIM) card or a memory card for storing information.

The power supply portion 125 is mounted in the rear case 113 so as to supply power to the mobile terminal 100. The power supply portion 125 may be attachably/detachably mounted in the rear case 113 so as to perform a charging operation, for example, as a rechargeable battery.

Figure 2:
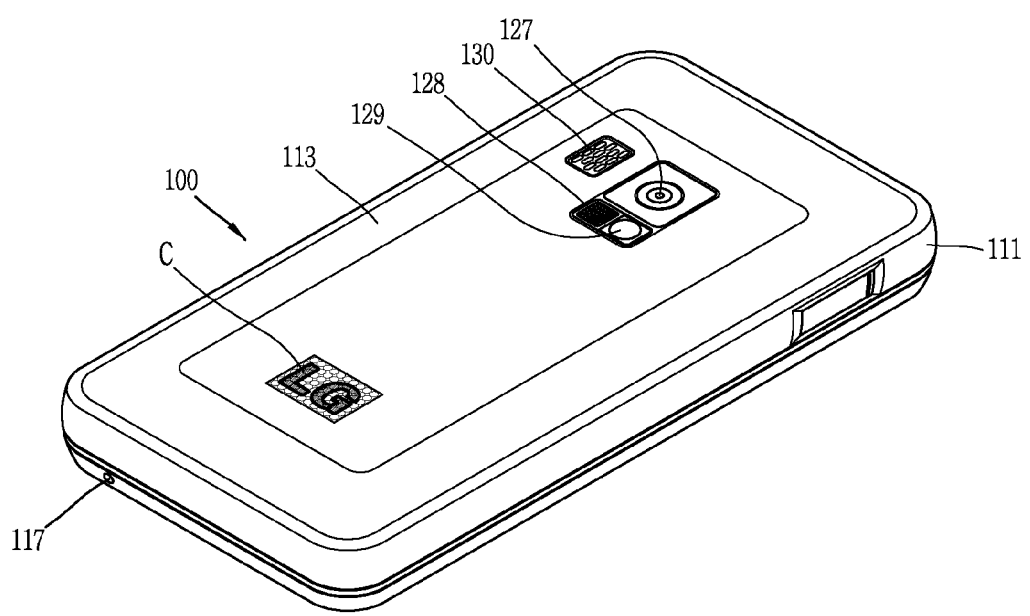
FIG. 2 is a rear perspective view of the mobile terminal according to the exemplary embodiment.

FIG. 2 is a rear perspective view of the mobile terminal 100 according to the exemplary embodiment.

Referring to FIG. 2, a second video input portion 127, a second audio output portion 130, an antenna 131 for broadcasting signal reception, etc. may be additionally disposed in the rear case 113.

The second video input portion 127 has a photographing direction substantially opposite to that of the first video input portion 115 (See FIG. 1), and may be a camera having a different pixel density from the first video input portion 115. For example, the first video input portion 115 has a low pixel density so that it is possible to photograph a user's face and transmit the photographed image in a video conversation. Since a case frequently occurs in which the second video input portion 127 photographs a general subject and does not immediately transmit the photographed image, the second video input portion 127 preferably has a high pixel density.

A flash 128 and a mirror portion 129 are additionally disposed adjacent to the second video input portion 127. When a subject is photographed using the second video input portion 127, the flash 128 throws light on the subject. When a user photographs himself/herself (self-photographing) using the second video input portion 127, the mirror portion 129 enables the user to look at himself/herself therethrough.

The second audio output portion 130 may implement a stereo function together with the first audio output portion 114 (See FIG. 1), and may be used for conversation over the mobile phone 100 in a speakerphone mode.

The antenna 131 for broadcasting signal reception may be disposed close to any one side of the rear case 113, separately from an antenna 161 (See FIG. 3) for conversation over the mobile phone 100, etc. The antenna 131 may be provided to be extractable from the rear case 113.

Although it has been described above that the first manipulating portion 116, etc. are mounted in the front case 111 and the second manipulating portion 123, etc. are mounted in the rear case 113, the present invention is not limited thereto. For example, the second manipulating portion 123 may be disposed adjacent to the first manipulating portion 116 in the front case 111. Although the second video input portion 127 is not separately provided, the first video input portion 115 may be configured to be rotatably formed so that the first video input portion 115 can perform a photographing operation up to the photographing direction of the second video input portion 127.

Figure 3:
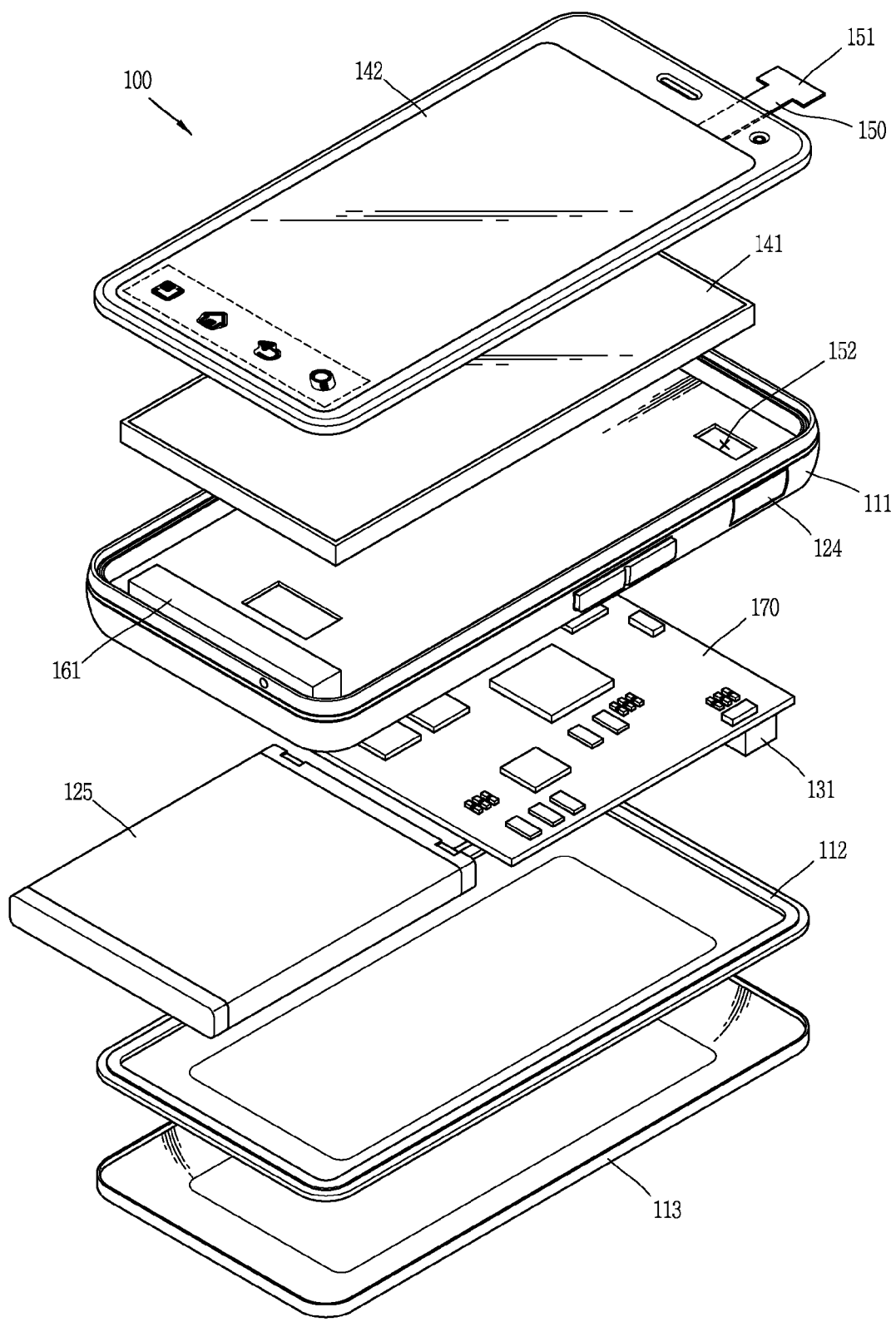
FIG. 3 is an exploded perspective view of the mobile terminal of FIG. 1.

FIG. 3 is an exploded perspective view of the mobile terminal 100 of FIG. 1.

Referring to FIG. 3, the window portion 142 is coupled to the front case 111 so as to cover one surface of the front case 111. The window portion 142 covers one surface of the display module 141 so that visual information output from the display module 141 is recognized from the outside. The display module 141 and the window portion 142 constitute the display portion 140 (See FIG. 1).

The window portion 142 is formed to recognize a user's touch, and enables information (a command, signal, etc.) to be input from the outside.

The window portion 142 may have an area corresponding to that of the display module 141, and may be formed of a material through which light can be transmitted. An opaque area may be formed at the window portion 142. Here, the opaque area allows light not to be transmitted therethrough or has a very low transmittance. For example, surface treatment may be performed on the window portion 142 so that light cannot be transmitted along an edge of the window portion 142.

A manipulating pad corresponding to the first manipulating portion 116 may be formed in the front case 111. The manipulating pad becomes an object to be touched or pressed by a user. The manipulating pad may be formed as a manipulating area at a portion of the window portion 142.

An audio hole, a window hole and a video window may be formed in the front case 111.

The audio hole is formed to correspond to the audio output portion 114 so that an audio, e.g., a bell sound, music, etc. is output to the outside therethrough. The window hole is formed to correspond to the display portion 140. The light-transmissive video window may be formed to correspond to the first video input portion 115 (See FIG. 1).

A circuit board 170, the display module 141, a speaker module, a camera module, a switch, etc. may be mounted in the rear case 21.

The circuit board 170 may be configured as an example of a control portion for performing various types of functions of the mobile terminal 100. The circuit board 170 may detect an electrical change, e.g., an electrostatic capacitance or change in the amount of electric charges, generated from the inside of the window portion 142 as a user touches the window portion 142.

An electrode is built in the inside of the window portion 142. The electrode may be formed with a conductive pattern. Electric charges may be charged in the electrode. If a conductor moves at a close distance from the electrode, the amount of electric charges charged in the electrode according to the movement of the conductor may be changed. If a conductor, e.g., a user's finger touches the window portion 142, the amount of electric charges charged in the electrode. This is the same as the amount of electric charges between the user's finger and the electrode is changed.

The electrode of the window portion 142 is electrically connected to the control portion for detecting a change in the amount of electric charges, e.g., the circuit board 170. To this end, a flexible circuit board 150 may be connected to the circuit board 170 (See FIG. 3) by passing through a hole 152. The circuit board 170. As the change in the amount of electric charges is detected, the circuit board 170 may change the sate of at least one of functions related to the mobile terminal 100.

The flexible circuit board 150 is extended from one end of the window portion 142. A connecting portion 151 may be formed at the one end of the flexible circuit board 150 so as to be connected to the electrode, and the other end of the window portion 142 may be connected to the circuit board 170 by a connector. The connecting portion 151 may be formed of a metal material so as to maintain constant stiffness and elasticity.

The circuit board 170 may be connected to the antennas 131 and 161 respectively formed close to the upper and lower ends of the mobile terminal 100.

Hereinafter, an exemplary embodiment will be described with the accompanying drawings.

Figure 4:
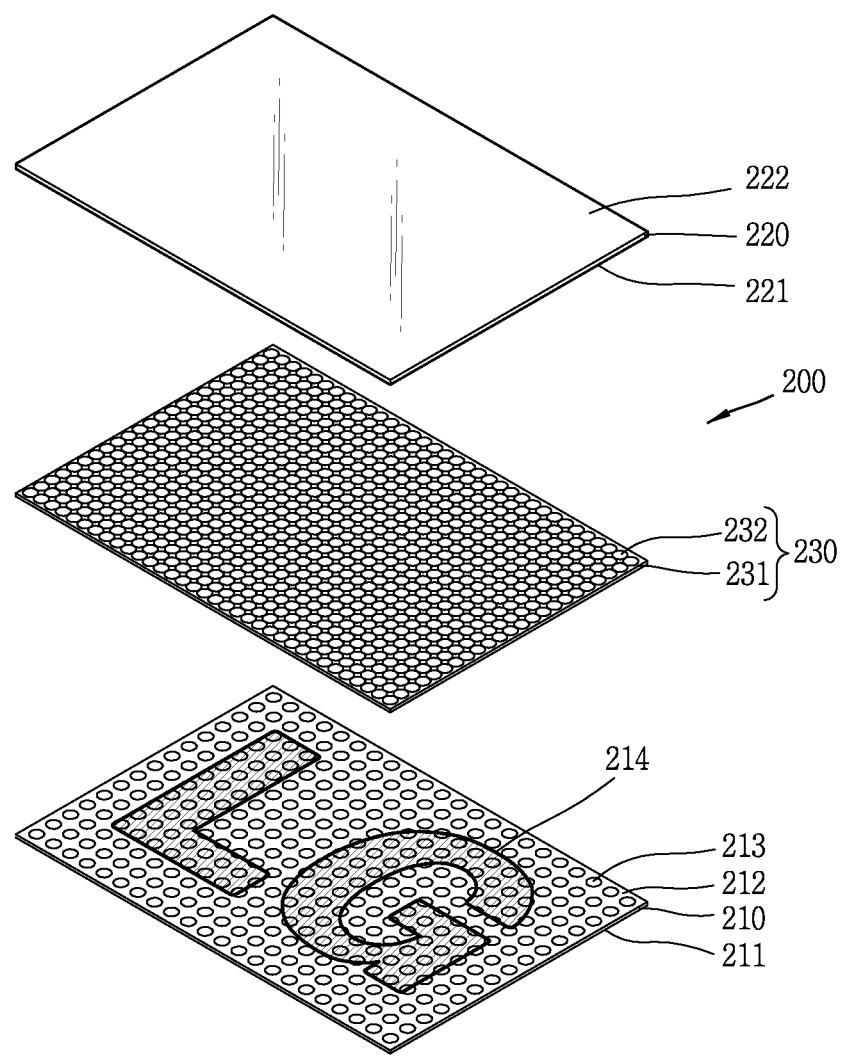
FIG. 4 is an exploded perspective view of a stereoscopic cover portion according to an exemplary embodiment.
Figure 5:
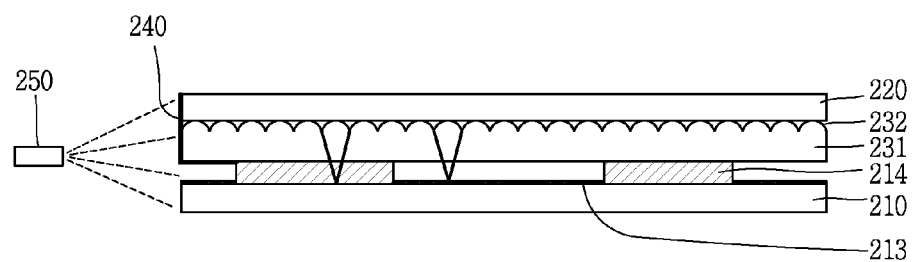
FIG. 5 is a sectional view of FIG. 4.

FIG. 4 is an exploded perspective view of the stereoscopic cover portion 200 according to a first exemplary embodiment. FIG. 5 is a sectional view of FIG. 4.

In order to avoid the monotonousness of the external appearance of the mobile terminal 100 and provide a stereoscopic effect to the mobile terminal 100, the stereoscopic cover portion 200 may be mounted in an opening formed in each of the cases 111 and 113 constituting the external appearance of the mobile terminal 100. The stereoscopic cover portion 200 may form an external appearance of the manipulating portion. The stereoscopic cover portion 200 may be formed at a portion displaying a logo of the mobile terminal 100. That is, referring to FIGS. 1 and 2, the stereoscopic cover portion 200 may be formed in portions A to C.

The stereoscopic cover portion 200 provides the stereoscopic effect by itself, and may improve the external appearance of the mobile terminal 100.

In order to minimize an increase in the thickness of the mobile terminal 100 while providing an illumination effect, a light emitting portion 250 may be provided close to a side of the stereoscopic cover portion 200, and the illumination effect may be provided using an edge method in which light is incident to a side surface of the stereoscopic cover portion 200. It will be apparent that the illumination effect may be provided using a method in which the light emitting portion 250 is mounted under the stereoscopic cover portion 200 so as to irradiate light vertically to the stereoscopic cover portion 200.

Hereinafter, stereoscopic images formed by the first, second and third pattern layers are referred to as first, second and third patterns, respectively.

As shown in FIG. 4, the stereoscopic cover portion 200 includes a first member 210, a second member 220, a lens array layer 230 stacked between the first and second members 210 and 220, a first pattern layer 213 and a shielding wall 240.

The first and second members 210 and 220 are formed in the shape of a thin plate so as to cover each other. That is, the first and second members 210 and 220 are disposed opposite to each other, and may be formed of transparent or translucent synthetic resin such as polyethylene terephthalate (PET).

The first and second members 210 and 220 may be formed of different materials from each other.

The first member 210 may have first and second surfaces 211 and 212 opposite to each other, and the second member 220 may have third and fourth surfaces 221 and 222 opposite to each other. The first pattern layer 213 may be formed on any one of the first and second surfaces 211 and 212, and a second pattern layer may be formed on the third and fourth surfaces 221 and 222 so as to form the stereoscopic effect together with the first pattern layer 213 or to improve the stereoscopic effect caused by the first pattern layer 213. A third pattern layer 214 corresponding to at least one of a symbol, a character and a figure may be formed on a top surface of the first pattern layer 213 so as to cover at least one portion of the first pattern layer 213.

An ultraviolet (UV) film layer may be formed between the lens array layer 230 and each of the members 210 and 220. The UV film layer is an adhesive layer for coupling the lens array layer 230 and each of the members 210 and 220 to each other, and may be formed of UV curable resin cured by irradiating UV in the state in which the lens array layer 230 and the each of the members 210 and 220 face each other. The UV film layer preferably has an appropriate difference in refractive index with the lens array layer 230 so as to adjust the refractive angle of light incident from the lens array layer 230. Meanwhile, the UV film layer may be formed of, for example, acryl-based resin, polycarbonate-based resin, MS-based resin (methyl metacrylate, styrene copolymer resin), polystyrene, PET, etc.

The lens array layer 230 is formed by arranging lenses 232 in a lattice form. Here, the lenses 232 are protruded or recessed from one surface of the lens array body 231.

The lens 132 have a predetermined focal distance, and the shape or pattern of the first or second pattern layer 213 or 214, positioned at the focal distance, may be magnified or reduced through the lens 232. The first member 210 may be formed to have a thickness corresponding to the focal distance or to have a thickness greater or smaller than the focal distance.

The lens array layer 230 is configured by forming a plurality of hemispherical lenses 232 beneath the second member 220. In the lens array layer 230, the radius of curvature of the hemispherical lenses 232, the interval between the hemispherical lenses 232, the refractive index of the lens array layer 230, etc. are appropriately adjusted so as to obtain an optimal disparity. Hemispherical lenses (concave lenses) may be arranged to face downward, but hemispherical lenses (convex lenses) may be arranged to face upward. That is, the stereoscopic cover portion 200 including the lens array layer 230 is formed into a structure in which refraction occurs on a travel path of light, and the position relation with the first pattern layer 213 below the lens array layer 230 is necessarily controlled well to optimize the disparity.

The lens array layer 230 is provided with a plurality of hemispherical lenses, and the hemispherical lenses may be arranged in a two-dimensional array structure on a two-dimensional plane. Similarly to the UV film layer, the lens array layer 230 may be formed of UV curable resin. For example, the lens array layer 230 may be formed of acryl-based UV curable resin, silicon-based UV curable resin, nitrogen-based UV curable resin, etc.

The lens array layer 230 allows a user to recognize the first pattern layer 213 disposed therebelow as a stereoscopic image.

The principle of allowing a person to recognize a stereoscopic image will be described. Since the person's left and right eyes are spaced apart at a predetermined interval, the disparity between the person's left and right eyes occurs, and the person's brain properly analyzes the disparity, so that the person feels a stereoscopic object (space). A lenticular sheet, lencell sheet, etc. may be used to maximize the stereoscopic object recognition effect according to the disparity.

In the principle of forming a stereoscopic image, the lenses 232 corresponding to left and right intervals are respectively adhered on patterns on which left and right images can be displayed based on the person's parity characteristic, only different left and right patterns are respectively viewed by the person's left and right eyes, so that the person feels the stereoscopic image.

As shown in FIG. 5, the lens array layer 230 having the plurality of hemispherical lenses is formed at an upper portion of the stereoscopic cover portion 200, and the first pattern layer 213 having patterns disposed periodically is formed below the lens array layer 230. Then, if the periodic interval between the patterns and the interval between the hemispherical lenses appropriately correspond to each other, the person's left and right eyes recognizes different patterns from each other. Accordingly, the person's brain properly combines the patterns respectively recognized by the person's left and right eyes, and recognize the combined image as a stereoscopic image.

The first pattern layer 213, the second pattern layer or the third pattern layer 214 which will be described later may be formed using a printing method or an etching method including a photolithography process. In addition, the pattern layers may be formed by protruding at least one portion and printing the protruded portion or by performing the photolithography process.

When patterns are formed through printing, a pattern layer is generally formed using a precise printing apparatus called as an offset printing apparatus. When the offset printing apparatus is used, it is possible to print a pattern layer having a pitch of 100 μm or less.

Meanwhile, when patterns are formed using the etching method, a metal layer is deposited on a substrate, and a metal pattern is formed through a photolithography process. The photolithography process is one of pattern forming processes frequently used in a semiconductor process, and even a pattern having a size of a few tens to a few hundreds of μm may be formed using the photolithography process. Thus, a pattern having a size of a few tens of μm or so can be more easily formed using the photolithography process.

The patterns formed in the first pattern layer 213, the second pattern layer and the third pattern layer 214 may be formed at various positions at which disparities occur. The patterns may be formed to be viewed differently depending on a position of sight. Accordingly, if the stereoscopic cover portion 200 is rotated, a 3D image having various shapes can be displayed. Furthermore, a dynamic feeling can be provided to the 3D image.

Meanwhile, the vertical position relation between the patterns formed in the first pattern layer 213, the second pattern layer and the third pattern layer 214 is related to a focal distance of each of the lenses formed in the lens array layer 230. That is, in the vertical position relation between the lens arrangement and the pattern layers, the thickness of each portion of the lens array layer 230, the curvature of the lenses, etc. is appropriately adjusted so that the focuses of the lenses 232 formed in the lens array layer 230 are positioned in the respective patterns of the first or third pattern layer 213 or 214. The refractive index of the lens array layer 230 or the UV film layer may also be adjusted.

The light emitting portion 250 is disposed close to any one side of the stereoscopic cover portion 200. The light emitting portion 250 may include an LED so as to provide a more splendid illumination effect. Alternatively, the light emitting portion 250 may include an optic fiber.

The light irradiated by the light emitting portion 250 is preferably formed so that the amount of light transmitted through the first member 210 is greater than that of light transmitted through the second member 220. Thus, it is possible to provide a more splendid illumination effect together with the stereoscopic effect. That is, a user feels as if light was irradiated between images respectively recognized as first and third patterns by the user, and thus it is possible to implement a more unique 3D image effect. Further, the thickness of the stereoscopic cover portion 200 in which the light emitting portion 250 is disposed can be reduced, and thus it is possible to decrease the size of the mobile terminal 100.

To this end, the shielding wall is formed between the lens array layer 230 and the light emitting portion 250. The shielding wall 240 is formed with a film capable of remarkably lowering the transmittance of light. A high-density polyethylene-based film may be used as an example of the film. The shielding wall 240 may be formed with other films using synthetic resin that is dark and has a high reflection coefficient. The lens array layer 230 and the second member 220, positioned close to the light emitting portion 250, may be covered with a metallic material so as to reduce the transmission of light.

As such, the shielding wall 240 is necessarily formed so that the amount of light transmitted through the second member 220 and the lens array layer 230 is remarkably smaller than that of light transmitted through the first member 210.

The shielding wall 240 may be extended from a side to an inside thereof so as to cover at least one portion of the lens array layer 230. Thus, it is possible to decrease the amount of light transmitted through the lens array layer 230 and the second member 220.

FIGS. 6A to 6D illustrate modifications of the stereoscopic cover portion 200 according to the first exemplary embodiment shown in FIG. 5. FIG. 7 is a plan view of the stereoscopic cover portion 200 shown in FIGS. 6C and 6D.

Figure 6A:
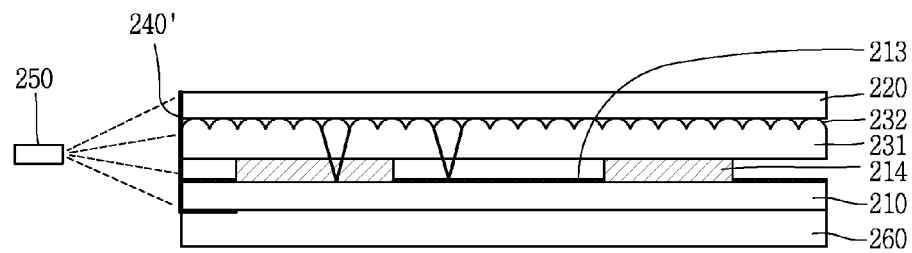
FIGS. 6A to 6D illustrate modifications of the stereoscopic cover portion shown in FIG. 5.
Figure 7:
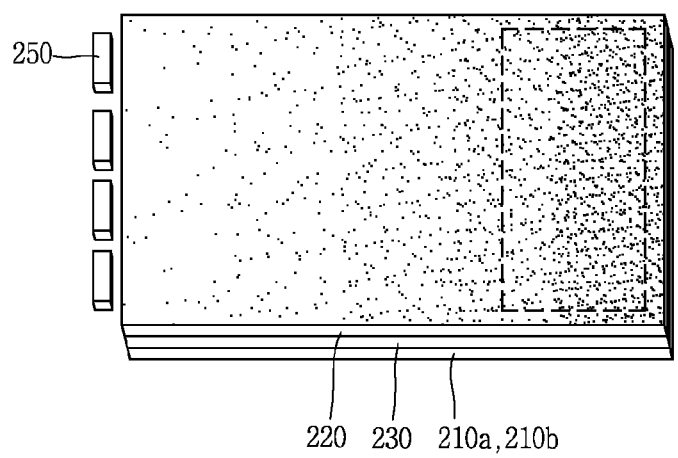
FIG. 7 is a plan view of the stereoscopic cover portion shown in FIGS. 6C and 6D.

Unlike the first exemplary embodiment, the stereoscopic cover portion 200 according to a first modification shown in FIG. 6A has a polarizing plate 260 disposed to cover the first member 210. A shielding wall 240' is extended to the first member 210, and light is transmitted through the polarizing plate 260. The polarizing plate 260 allows only a specific wavelength of incident light to be transmitted therethrough, and thus it is possible to provide an illumination effect different from the first exemplary embodiment. That is, while the effect of emitting light between the first pattern layer 213 and the second pattern layer can be provided in the first exemplary embodiment, the effect of emitting light of a specific wavelength from the rear of the first pattern layer 213 can be provided in the first modification.

Figure 6B:
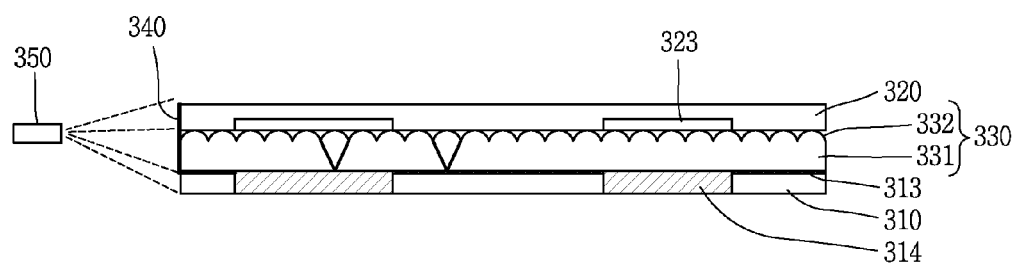

In a second modification shown in FIG. 6B, a third pattern layer 314 is formed on the same plane of a first pattern layer 313. In the exemplary embodiment, only the first pattern of the first pattern layer 213 is magnified or reduced to have a stereoscopic effect. However, in the second modification, the third pattern as well as the first pattern is magnified or reduced by a lens array layer 330 so as to have a stereoscopic effect. That is, the first and third patterns printed at the focal distances of the lenses are magnified or reduced to provide a stereoscopic effect. Accordingly, it is possible to obtain a visible effect as if the third pattern corresponding to at least one of a symbol, a character and a figure was floated on the first pattern.

Figure 6C:
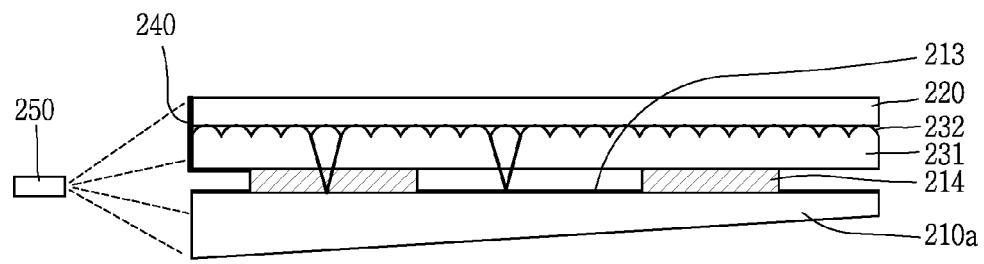
Figure 6D:
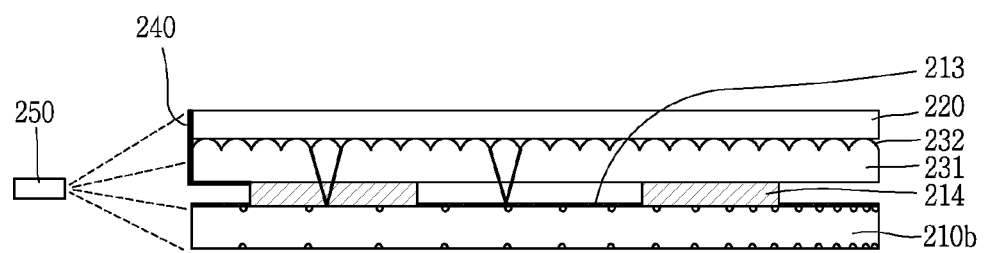

FIGS. 6C and 6D illustrate modifications in which the degree of haze or diffusion of the first member 210 by modifying the shape or thickness of the first member 210 or by adding a heterogeneous material to the first member 210.

In a third modification shown in FIG. 6C, unlike the first exemplary embodiment, the thickness of a first member 210a is gradually increased or decreased in one direction. Thus, the amount of light transmitted through the first member 210a can be further increased or decreased.

In a fourth modification shown in FIG. 6D, a heterogeneous material is added to the inside of a first member 210b, or prominences are formed on an inner surface of the first member 210b to have a roughness.

The roughness has influence on the reflection or diffusion of light, and therefore, the amount of light transmitted through the first member 210b may be changed. That is, the amount of light transmitted through the first member 210b may be gradually decreased in one direction by gradually increasing the density of the heterogeneous material or the roughness in the one direction. On the contrary, the amount of light transmitted through the first member 210b may be gradually increased in one direction by gradually decreasing the density of the heterogeneous material or the roughness in the one direction.

FIG. 7 is a plan view of the stereoscopic cover portion 200 shown in FIGS. 6C and 6D. In FIG. 7, as the amount of light transmitted is gradually decreased in one direction, the brightness of light emitted is gradually decreased in the one direction. As such, an adjusting pattern may be formed by adjusting the thickness of the first member 210, by adjusting the density of the heterogeneous material added to the first member 210 or by adjusting the roughness of the inner surface of the first member 210. As described above, the amount of light transmitted through the first member 210 is formed by forming the adjusting pattern in the first member 210, so that it is possible to provide a more unique light emitting effect as well as a stereoscopic effect.

Figure 8A:
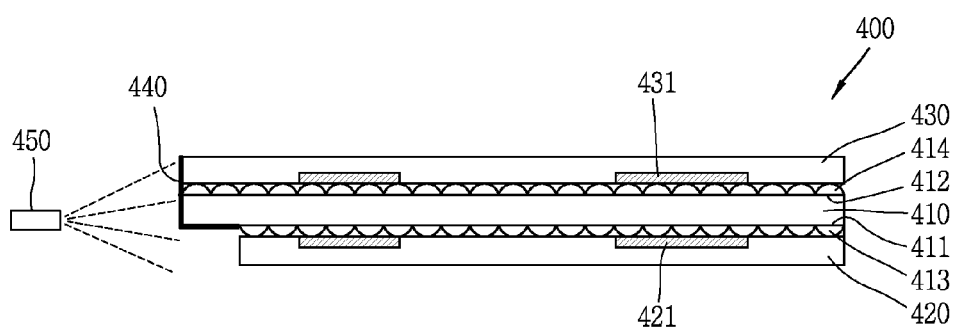
FIGS. 8A and 8B are sectional views of a stereoscopic cover portion according to another exemplary embodiment.
Figure 8B:
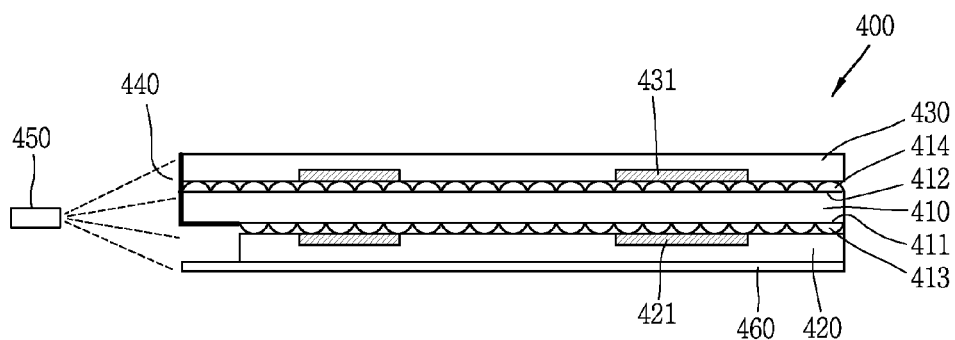

FIGS. 8A and 8B are sectional views of a stereoscopic cover portion according to a second exemplary embodiment. In the second exemplary embodiment, descriptions components identical or similar to those of the first exemplary embodiment will be omitted, and components different from those of the first embodiment will be described. In the second exemplary embodiment, at least one portion of the first to fourth modifications described above may be combined, and the combination may be applied to the second exemplary embodiment.

According to the exemplary embodiment, the stereoscopic cover portion 400 includes a plate member 410, a first lens array layer 414 disposed on an upper plate surface 412 of the plate member 410, and a first plate pattern 421. The stereoscopic cover portion 400 may further include a second lens array layer 413 disposed on a lower plate surface 411 of the plate member 410.

The plate member 410 corresponds to the first member 210 of the first exemplary embodiment, and is formed in the shape of a thin plate. The plate member 410 may be formed of transparent or translucent synthetic resin.

The first and second lens array layers 414 and 413 correspond to the lens array layer 230 of the first exemplary embodiment. However, unlike the first exemplary embodiment, the plate member 410 and the lens array layers 413 and 414 in the second exemplary embodiment may be integrally formed through injection molding. Thus, the size of lenses and the thickness of the plate member 410 may be increased as compared with the first exemplary embodiment, but the stereoscopic cover portion 400 can be formed to have a variety of shapes as compared with that formed through a thermoforming process.

Each of the first and second lens array layers 414 and 413 includes a plurality of lenses. The lens array layers 413 and 414 may be formed of transparent resin, e.g., polycarbonate (PC), and the lenses may be formed through a thermoforming process using a mold having a shape of irregularity opposite to that of the lenses to be formed. The lens array layers 413 and 414 are not limited to the PC, and may be formed of various types of resin such as transparent polymethyl methacrylate, polyester, polyvinyl chloride, polystyrene, urethane acrylate, epoxy acrylate, ester acrylate, polyethylene terephthalate (PET) and acrylonitrile butadiene styrene (ABS) copolymer. However, an appropriate material is necessarily selected in consideration of the refractive index of the lenses, the thicknesses of the lens array layers 413 and 414 and the plate member 410 according to the refractive index of the lenses, etc.

The first plate pattern 421 is formed to cover at least one portion of the lower plate surface 411. A second plate pattern 431 is formed to cover at least one portion of the upper plate surface 412. The first and second plate patterns 421 and 431 may be formed using any one of printing and etching methods. The first or second plate pattern 421 or 431 may correspond to at least one of a symbol, a character and a figure.

The first and second plate patterns 421 and 431 may be formed close to the focal distances of lenses of the first and second lens array layers 414 and 413, respectively. Thus, it is possible to form double stereoscopic images respectively corresponding to the first and second plate patterns 421 and 431.

In addition, one stereoscopic image may be formed by combining the first and second plate patterns 421 and 431. Thus, it is possible to provide a stereoscopic effect different from that of the first exemplary embodiment.

A light emitting portion 450 is disposed close to any one side of the stereoscopic cover portion 400. The light emitting portion 450 may include an LED so as to provide a more splendid illumination effect. Alternatively, the light emitting portion 450 may include an optic fiber.

A shielding wall 440 is formed between the plate member 410 and the light emitting portion 450 so as to decrease the transmittance of light irradiated to the plate member 410 from the light emitting portion 450. The shielding wall 440 may be extended from a side end thereof so as to cover at least one portion of the lower plate surface 411.

Unlike the first exemplary embodiment, the shielding wall 440 may be formed using a method of lowering the transmittance of light by processing the irradiation surface of the upper plate surface 412 to be translucent or opaque. The method may be, for example, a method of increasing the reflection or diffusion of light by increasing the roughness of the irradiation surface or a method of increasing the haze of the irradiation surface by increasing the density of a heterogeneous material.

As a modification of the second exemplary embodiment, a polarizing plate may be disposed to cover the plate member 410, or the thickness of the plate member 410 may be continuously changed. The light emitting portion 450 may be formed of an optic fiber, and the optic fiber may be disposed to cover a side of the stereoscopic cover portion 400.

Figure 9A:
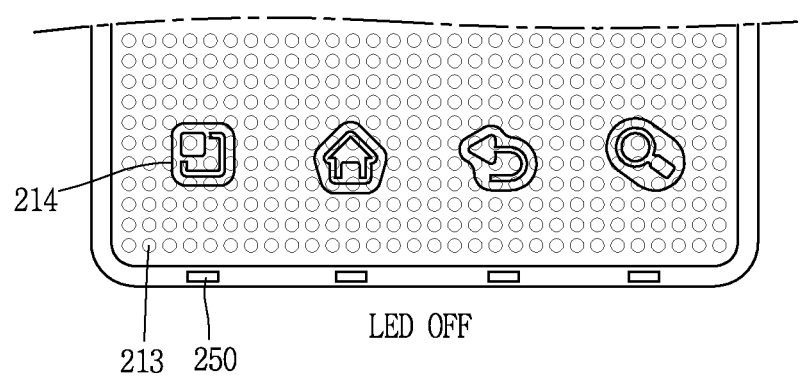
FIGS. 9A and 9B illustrate states of a stereoscopic cover portion mounted to the mobile terminal of FIG. 1.
Figure 9B:
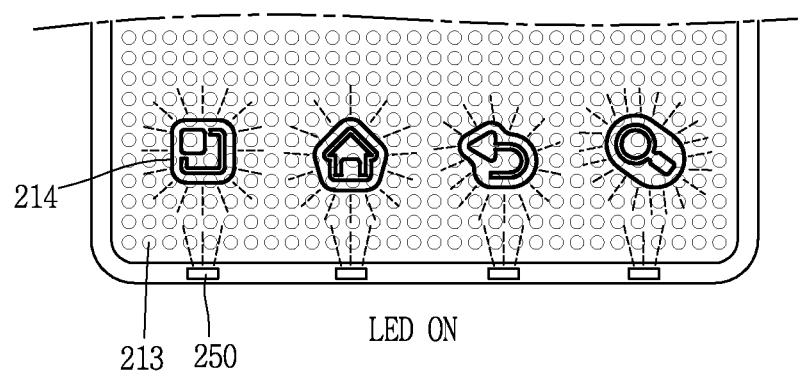

FIGS. 9A and 9B illustrate states of a stereoscopic cover portion mounted to the mobile terminal of FIG. 1. Particularly, FIGS. 9A and 9B illustrate a stereoscopic cover portion formed at the portion B at which the manipulating portion shown in FIG. 1 is disposed. As shown in FIG. 9A, the stereoscopic cover portion provides only a stereoscopic effect in the state in which an LED is turned off. However, as shown in FIG. 9B, the stereoscopic cover portion can provide not only the stereoscopic effect but also unique illumination in the state in which the LED is turned on.

Figure 10A:
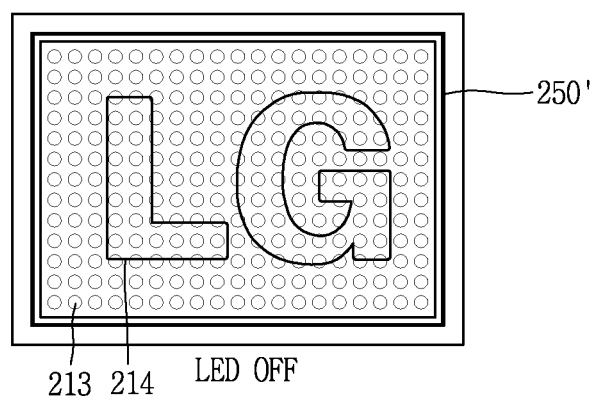
FIGS. 10A and 10B illustrate states of a stereoscopic cover portion mounted to the mobile terminal of FIGS. 1 and 2.
Figure 10B:
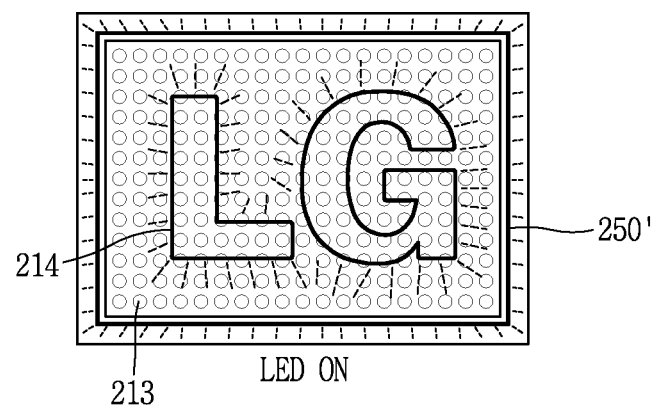

FIGS. 10A and 10B illustrate states of a stereoscopic cover portion mounted to the mobile terminal of FIGS. 1 and 2. Particularly, FIGS. 10A and 10B illustrate a stereoscopic cover portion formed at the portion A at which the logo shown in FIG. 1 is disposed, the portion C of the battery cover shown in FIG. 2 or the entire portion of the battery cover. As shown in FIG. 10A, the stereoscopic cover portion provides only a stereoscopic effect in the state in which an optic fiber 250' is turned off. However, as shown in FIG. 10B, the stereoscopic cover portion can provide not only the stereoscopic effect but also unique illumination in the state in which the optic fiber 250' is turned on.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a main body defining an outer surface of the mobile terminal and being further shaped to define an aperture;
   a cover portion sized to be received within the aperture of the main body, wherein an outer surface of the cover portion lies generally parallel and proximate to the outer surface of the main body; and
   a light emitting device positioned in the main body and configured to direct light toward at least one edge of the cover portion,
   wherein the cover portion comprises:
      a first plate member comprising a transparent or translucent material and positioned away from the outer surface of the main body toward an interior portion of the main body;
      a second plate member comprising a transparent or translucent material, a surface of the second plate member forming the outer surface of the cover portion, wherein the second plate member is arranged in a stacked configuration with the first plate member;
      a lens array layer positioned between the first plate member and the second plate member, the lens array layer comprising a plurality of convex lenses or concave lenses arrayed on at least one surface of the lens array layer;
      a first pattern layer positioned on a surface of the first plate member; and
      a light shielding wall positioned along an edge of the lens array layer between the light emitting device and the lens array layer and configured to decrease a transmittance of light irradiated to the lens array layer from the light emitting device.

2. The mobile terminal of claim 1, further comprising a second pattern layer positioned on a surface of the second plate member.

3. The mobile terminal of claim 1, wherein the light shielding wall extends along at least a portion of a surface of the first plate member closest to the second plate member.

4. The mobile terminal of claim 1, further comprising:
   a second pattern layer positioned between the first pattern layer and the lens array layer,
   wherein the second pattern layer corresponds to a symbol, a character or a figure and covers at least a portion of the first pattern layer.

5. The mobile terminal of claim 1, wherein the first pattern layer is positioned proximate to focal distances of the plurality of convex lenses or concave lenses.

6. The mobile terminal of claim 1, wherein the light shielding wall extends along at least a portion of a surface of the first plate member furthest from the second plate member.

7. The mobile terminal of claim 6, wherein the cover portion further comprises:
   a polarizing plate stacked on the surface of the first plate member furthest from the second plate member.

8. The mobile terminal of claim 1, wherein the first plate member is configured for producing a higher degree of light diffusion than the second plate member.

9. The mobile terminal of claim 1, wherein:
   the first plate member is configured for providing a light path from an edge of the first plate member positioned proximate to the light emitting device to an opposite edge of the first plate member positioned away from the light emitting device; and
   the first plate member further comprises a repeatedly changing adjusting pattern configured for adjusting a degree of light diffusion from the edge of the first plate member positioned proximate to the light emitting device to the opposite edge of the first plate member positioned away from the light emitting device.

10. The mobile terminal of claim 1, wherein a thickness of the first plate member varies gradually from an edge of the first plate member positioned proximate to the light emitting device to an opposite edge of the first plate member positioned away from the light emitting device.

11. The mobile terminal of claim 1, wherein the light emitting device comprises an optic fiber enclosing an edge of the cover portion.

12. The mobile terminal of claim 1, wherein the first plate member further comprises a polarizing plate.

13. A mobile terminal, comprising:
   a main body defining an outer surface of the mobile terminal and being further shaped to define an aperture;
   a cover portion sized to be received within the aperture of the main body, wherein an outer surface of the cover portion lies generally parallel and proximate to the outer surface of the main body; and
   a light emitting device positioned in the main body and configured to direct light toward at least one edge of the cover portion, wherein the cover portion comprises:
- a plate member comprising a transparent or translucent material, a first surface of the plate member positioned proximate the outer surface of the main body and a second surface of the plate member positioned away from the outer surface of the main body toward an interior portion of the main body;
- a first lens array layer positioned on the first surface and comprising a plurality of convex lenses or concave lenses;
- a first plate pattern positioned to cover at least a portion of the second surface of the plate member; and
- a light shielding wall positioned between the plate member and the light emitting device and configured to decrease a transmittance of light irradiated to the plate member from the light emitting device.

14. The mobile terminal of claim 13, wherein the light shielding wall extends along at least a portion of the second surface of the plate member.

15. The mobile terminal of claim 14, wherein the first plate pattern corresponds to a symbol, a character or a figure.

16. The mobile terminal of claim 14, wherein the light shielding wall is positioned along an edge of the plate member.

17. The mobile terminal of claim 14, wherein the cover portion further comprises a polarizing plate stacked on the second surface of the plate member.

18. The mobile terminal of claim 13, wherein the light emitting device comprises an optic fiber enclosing an edge of the cover portion.

19. The mobile terminal of claim 13, wherein the cover portion further comprises a second lens array layer positioned on the second surface of the plate member and comprising a plurality of convex lenses or concave lenses.

20. The mobile terminal of claim 19, wherein the cover portion further comprises a second plate pattern positioned to cover at least a portion of the first lens array layer.

21. The mobile terminal of claim 13, wherein:
- the plate member is configured for providing a light path from an edge of the plate member positioned proximate to the light emitting device to an opposite edge of the plate member positioned away from the light emitting device; and
- the plate member further comprises a repeatedly changing adjusting pattern configured for adjusting a degree of light diffusion from the edge of the plate member positioned proximate to the light emitting device to the opposite edge of the plate member positioned away from the light emitting device.

22. The mobile terminal of claim 13, wherein a distance between the first plate pattern and the first lens array layer is substantially equal to focal distances of the plurality of convex lenses or concave lenses of the first lens array layer.

* * * * *